(12) United States Patent
Pearce et al.

(10) Patent No.: US 8,197,585 B2
(45) Date of Patent: Jun. 12, 2012

(54) FRICTION MATERIAL AND PROCESS FOR THE PRODUCTION THEREOF

(75) Inventors: Jeremy Arthur Pearce, St. Albans (GB); Stephen John Glynn, Rochdale (GB)

(73) Assignees: Rimsa Metal Technology, Barcelona (ES); Itri Limited, St. Albans, Hertfordshire (GB)

( * ) Notice: Subject to any disclaimer, the term of this patent is extended or adjusted under 35 U.S.C. 154(b) by 1015 days.

(21) Appl. No.: 11/995,173

(22) PCT Filed: Jul. 7, 2006

(86) PCT No.: PCT/GB2006/002554
§ 371 (c)(1),
(2), (4) Date: Jun. 2, 2008

(87) PCT Pub. No.: WO2007/007082
PCT Pub. Date: Jan. 18, 2007

(65) Prior Publication Data
US 2010/0011988 A9    Jan. 21, 2010

(30) Foreign Application Priority Data
Jul. 11, 2005 (GB) .................................. 0514218.7

(51) Int. Cl.
*C09K 3/14* (2006.01)
*F16C 33/20* (2006.01)

(52) U.S. Cl. ........................................ 106/36; 508/100

(58) Field of Classification Search ................... 106/36; 508/100
See application file for complete search history.

(56) References Cited

U.S. PATENT DOCUMENTS 5,894,016 A * 4/1999 Fister .......................... 423/511
6,220,405 B1 * 4/2001 Kesavan et al. ........... 188/251 A

FOREIGN PATENT DOCUMENTS

EP          0108892 A2    5/1984
WO      99/52997 A1    10/1999

OTHER PUBLICATIONS

Abstract of WO 9952997; Oct. 21, 1999.
Abstract of EP 0108892; May 23, 1984.
International Search Report, PCT/GB2006/002554, dated Nov. 13, 2006, 3 pages.
Written Opinion of the International Searching Authority, PCT/GB2006/002554, dated Nov. 13, 2006, 5 pages.

* cited by examiner

*Primary Examiner* — Shuangyi Abu Ali
(74) *Attorney, Agent, or Firm* — Senniger Powers LLP

(57) ABSTRACT

A process for the in-situ formation of a lubricating phase comprising sulphur and tin in a friction material, wherein reaction of a sulphur source with a tin source in said friction material results in the formation of said lubricating phase, and wherein said reaction is initiated or effected by heat resulting, in use, from the generation of friction, wherein said sulphur source is selected from one or both of sulphur and/or a metal sulphide selected from one or more of iron, copper, zinc, titanium and bismuth, and wherein said tin source is selected from one or more of tin, a tin-containing compound and/or a tin-containing alloy.

24 Claims, No Drawings

FRICTION MATERIAL AND PROCESS FOR THE PRODUCTION THEREOF

The present invention relates to a friction material and a process for the production of a friction material. In particular, the present invention relates to a friction material that relies on a lubricating phase of a compound containing tin and sulphur.

Friction materials are used in brake pads, brake shoes, brake linings and clutch linings for automobiles, heavy goods vehicles, trains and the like. The resistance to sliding motion between, for example, a brake pad and a brake disc results in the generation of heat. Thus, at least some of the energy of motion is converted to heat as the vehicle brakes.

Friction materials are complicated multi-component materials and may comprise, for example, metal fibres, metal powders, organic or mineral fibres, binders, fillers and frictional components. Friction materials also often contain solid lubricants (also known as friction modifiers or stabilisers). The purpose of the lubricant is to improve the braking and wear characteristics of the friction material. For example, NVH (Noise, Vibration and Hardness) is an important parameter in many applications. The lubricant helps prevent wear, squeal and other undesirable effects.

Known solid lubricants for use in friction material formulations include graphite and sulphides of molybdenum, lead, antimony and tin.

Lead and antimony sulphides have been widely used as friction stabilisers in friction materials. However, lead and antimony sulphides are increasingly considered to be harmful to the environment.

While tin sulphides offer good performance and are considered less harmful than lead and antimony sulphides, these materials have a limited supply. The manufacturing process to form a friction formulation comprising a tin sulphide lubricating phase is also relatively expensive. Typically tin sulphide costs approximately three to four times the cost of antimony and lead sulphides. This has limited the uptake of tin sulphide technology.

The friction material according to the present invention is more environmentally friendly than conventional friction materials. It also represents the development of a commercially advantageous tin-based product.

Accordingly, in a first aspect, the present invention provides a process for the in-situ formation of a lubricating phase comprising sulphur and tin in a friction material, wherein reaction of a sulphur source with a tin source in said friction material results in the formation of said lubricating phase, and wherein said reaction is initiated or effected by heat resulting, in use, from the generation of friction, wherein said sulphur source is selected from one or both of sulphur and/or a metal sulphide selected from one or more of iron, copper, zinc, titanium and bismuth, and wherein said tin source is selected from one or more of tin, a tin-containing compound and/or a tin-containing alloy.

Preferably, the lubricating phase is or includes a sulphide of tin. The sulphide of tin will typically have the general formula $Sn_xS_y$, where x is form 0.5 to 5 and y is from 1 to 10. Preferably, x is form 1 to 5. Preferably, y is from 5 to 10. Suitable examples include one or more of SnS, $SnS_2$ and $Sn_2S_3$. $SnS_2$ is the preferred lubricating phase, although it will be appreciated that a complex combination of sulphides may be present.

$SnS_2$ will typically be formed if there is an excess of sulphur over tin at the reaction site. If there is insufficient sulphur, then a lower sulphide may be formed such as, for example, SnS or $Sn_2S_3$. As will be appreciated, in order to form $SnS_2$ the minimum (mole) ratio of sulphur to tin is 2:1. An excess above this stoichiometric ratio is, however, preferred so as to account for non-ideal solid state mixing.

In a preferred embodiment of the present invention there is an excess of said sulphur source above the stoichiometric level required to form a lubricating phase comprising a sulphide of tin. In a particularly preferred embodiment, an excess of said first precursor, for example $FeS_2$, is provided so as to convert all of the tin to $SnS_2$. For example, mixtures containing a two-fold ratio of $FeS_2$ to Sn may be used.

It will be appreciated that two or more different sulphur sources and/or two or more different tin sources may be included. In order to simplify the process, however, it is often desirable to have just two precursors, for example one sulphur source and one tin source.

The sulphur source may be one or both of sulphur and/or a metal sulphide. Examples of metal sulphides include one or more of iron, copper, zinc, titanium and bismuth, including combinations of two or more thereof. The preferred metal sulphides are one or more of FeS, $FeS_2$, $Cu_2S$, ZnS, $TiS_2$ and $Bi_2S_3$.

The use of a metal sulphide, preferably $FeS_2$, is preferred to the use of free sulphur. The metal sulphide may be provided in the form of a fine (for example micron-sized) powder. The metal sulphide may be encapsulated with a carbon source (for example a polymer) during blending.

Even though the use of metal sulphides is preferred, the addition of free sulphur to the formulations may be desirable for certain applications.

The tin source may be selected from one or more of tin, a compound containing tin and an alloy containing tin. Suitable examples include one or more of SnO, $SnO_2$ and a Cu—Sn bronze. The tin source may also be provided in the form of a fine (for example micron-sized) powder. The tin source may also be encapsulated with a carbon source (for example a polymer) during blending.

The friction material preferably further comprises a carbon source. Preferably, the carbon source, if present, may be selected from one or both of graphite and/or a polymer. Examples of suitable polymers include polyisobutylene (PIB) and phenolic resins. While not wishing to be restricted by theory it is considered that the presence of carbon prevents or restricts the burn-off of sulphur to, for example, $SO_2$. Also, in the case of tin oxide, for example $SnO_2$, the carbon source may reduce the tin oxide to metallic tin, which makes it more reactive with the sulphur source to form, for example, $SnS_2$.

Advantageously, the sulphur source and/or the tin source(s) is/are encapsulated in a carbon source, for example a polymer such as polyisobutylene (PIB). Preferably, the carbon source (preferably a polymer, more preferably PIB) should be included in the friction material in a proportion of less than or equal to 5 wt. % of the combined weight of the carbon, sulphur and tin sources.

The friction material may further comprises one or both of a reducing agent and/or a catalyst.

Graphite, if present, may function as both a lubricant and a reducing agent.

The formation of sulphides of tin can be accelerated in a reducing environment. For example, the reaction of tin or tin oxide and sulphur or $FeS_2$ is accelerated in a reducing environment. The underlying mechanisms are believed to involve complex intermediates, redox and disproportionation.

The presence of reducing agents such as graphite, for example, may affect the chemistry by controlling the extent and reversibility of oxidation reactions. For example, tin oxide will reduce to tin metal in the presence of carbon, while tin metal will combine with sulphur under pressure and appropriate conditions to produce mixed complex sulphides.

The sulphur source and the tin source will typically be present in the friction material in a combined total amount of up to 15% by weight and preferably in an amount of from 0.5 to 10% by weight, more preferably from 2 to 8% by weight, still more preferably from 4 to 6% by weight. Approximately 5% by weight is the optimum amount.

As will be appreciated by those skilled in the art, the friction material may comprise, in addition to the lubricating phase, one or more of metal fibres, metal powders, organic or mineral fibres, binders, fillers and frictional components.

As will also be appreciated, the lubricating phase may act as a friction stabiliser and/or modifier. Thus, the term lubricating phases is intended to encompass these terms as well.

The friction material may be or may be comprised in a brake pad, a brake shoe, a brake lining or a clutch lining.

In the present invention, the lubricating phase is formed in the friction material in-situ during the friction-generating process, for example the braking process. This is in contrast to conventional methods where the lubricating phase is formed during the manufacture of the friction material prior to its intended use. The lubricating phase will typically be formed in the surface region of the friction material. Tin sulphides are typically formed at the braking interface at temperature of from 600 to 900° C., more typically from 700 to 800° C.

In a second aspect, the present invention provides a friction material for a brake pad, brake shoe, brake lining or clutch lining, wherein said friction material includes a sulphur source and a tin source, wherein said sulphur source is selected from one or both of sulphur and/or a metal sulphide selected from one or more of iron, copper, zinc, titanium and bismuth, and wherein said tin source is selected from one or more of tin, a tin-containing compound and a tin-containing alloy, said friction material optionally further comprising a carbon source, and wherein, in use, said sulphur source and said tin source react in-situ to form a lubricating phase having the general formula $Sn_xS_y$, where x is form 0.5 to 5 and y is from 1 to 10, said reaction being initiated or effected by heat resulting from the generation of friction.

All features herein described with reference to the first aspect are equally applicable either singularly or in combination with the invention according to the second aspect.

The lubricating phase preferably has the general formula $Sn_xS_y$, where x is form 0.5 to 2 and y is from 1 to 3. More preferably, x is form 0.8 to 1.2 and y is from 1.5 to 2.5. Still more preferably, x is approximately 1 and y is approximately 2.

The sulphur source and the tin source are typically be present in the friction material in a combined total amount of up to 15% by weight. Preferably, the sulphur source and the tin source are present in a combined total amount of from 0.5 to 10% by weight, more preferably from 2 to 8% by weight, still more preferably from 4 to 6% by weight.

The sulphur source will typically be present in the friction material in an amount of up to 10% weight.

The tin source will typically be present in the friction material in an amount of up to 5% weight.

In stoichiometric terms, the ratio of the metal sulphide to tin (or a compound containing tin or an alloy containing tin) is preferably in the range of from 1:1 to 5:1. More preferably, there is at least two times the stoichiometric quantity of metal sulphide to tin (or a compound containing tin or an alloy containing tin).

The sulphur source and/or the tin source will typically be provided in the form of fine powders for blending in the friction material formulation. It should be appreciated that the efficacy of the conversion from the precursors to the active tin-sulphide species will depend on the particle size and surface area of the precursor particles. In the case of tin metal, powders with a mean particle size of 50 □m, and in the case of tin oxides, of less than 2 □m, are preferred.

Advantageously, the sulphur source and/or the tin source is/are encapsulated in a carbon source, for example a polymer such as polyisobutylene.

The friction material may further comprises one or both of a reducing agent and/or a catalyst.

Graphite, if present, may function as both a lubricant and a reducing agent.

The sulphur source may advantageously be coated with the tin source by, for example, a sol-gel technique. For example, sulphur source particles may be coated with tin oxide using a sol-gel technique. A suitable process for doing this is described in, for example, International (PCT) Application No. PCT/GB03/001561), which relates to processes for coating inorganic particulate materials with colloidal tin species. In a preferred embodiment of the present invention, colloidal $SnO_2$ is coated on, for example, $FeS_2$ particles.

As will be appreciated, the friction material according to the present invention will typically also include one or more of metal fibres (e.g. steel wool), metal powders, organic and mineral fibres, organic components and binders, fillers and frictional materials.

The present invention also provides a brake pad, brake shoe, brake lining or clutch lining comprising a friction material as herein described.

As mentioned above, there is preferably an excess of the sulphur source above the stoichiometric level required to form the lubricating phase. This feature will be described further by way of the following example. If the tin source comprises Sn and the sulphur source comprises $FeS_2$, then the in-situ reaction to form $SnS_2$ is: $Sn+FeS_2 \rightarrow SnS_2+Fe$. On a stoichiometric basis, to produce for example 5% by weight $SnS_2$ in the friction material, one would use 3.28% by weight $FeS_2$ and 3.25% by weight Sn in the formulation. However, the inventors have found that an excess of the metal sulphide above the stoichiometric level is often required to convert all of the tin to the desired sulphide. In particular, at least twice the stoichiometric amount and sometimes as much as five times the stoichiometric amount is required. Thus, for example, on the basis of 2:1 stoichiometry, the weight percentages in the friction material formulation would be 6.56% by weight $FeS_2$ to 3.25% by weight Sn. As will be appreciated, the calculation will be different for other metal sulphides such as FeS or $Cu_2S$, but the principle remains the same: an excess of the metal sulphide above the stoichiometric level is often required to convert all of the tin to the desired sulphide. In all formulations, 3.25% be weight of Sn should result in 5% by weight $SnS_2$, provided that complete conversion takes place.

A high degree of dispersion of the precursors in the friction material and the interfacial nature of the friction surface reaction can lead to a significant enhancement of the chemical interactions compared to bulk chemistries. Reaction products using the in-situ principle according to the present invention have different properties from those produced by conventional pre-formulation reactions.

In a preferred embodiment, coating particles with tin oxide using a sol-gel technique is used to further facilitate the dispersion of the precursor components and improve reactivity.

The present invention further provides a method of manufacturing a friction material for a friction element, wherein the method comprises incorporating a sulphur source and a tin source into a friction element, and wherein reaction of said sulphur source and said tin source results in the formation of a lubricating phase, said reaction being initiated or effected by heat resulting, from the generation of friction, wherein said sulphur source is selected from one or both of sulphur and/or a metal sulphide selected from one or more of iron, copper, zinc, titanium and bismuth, and wherein said tin source is selected from one or more of tin, a tin-containing compound and/or a tin-containing alloy.

The present invention further provides for the use of a tin source and a sulphur source for manufacturing a friction material, wherein reaction of said tin source and said sulphur source results in the formation of a lubricating phase, said reaction being initiated or effected by heat resulting from the generation of friction, wherein said sulphur source is selected from one or both of sulphur and/or a metal sulphide selected from one or more of iron, copper, zinc, titanium and bismuth, and wherein said tin source is selected from one or more of tin, a tin-containing compound and/or a tin-containing alloy.

The friction element may be, for example, a brake pad, brake shoe, brake lining or clutch lining.

The present invention describes the novel principle of utilising friction energy to produce the functional species from cheaper precursors. In particular, the present invention relies on thermal energy generated during normal driving and braking to form friction modifiers in-situ in the friction material. Cheaper basic tin and sulphur compounds may be used in the blends, whose reaction products are capable of significant effects on friction material performance. Thus, instead of adding expensive proprietary tin sulphide compounds into the friction material during manufacture, cheaper basic precursor additives such as elemental tin, tin oxide, sulphur and metal sulphides may be used. The normal temperature and pressure at the friction interface results in reaction of these precursors to form the active compounds at the surface of the friction material.

The present invention will now be described further with reference to the following Examples.

Table 1 shows simultaneous thermogravimetric analysis and differential scanning calorimetry analysis for samples of tin and iron disulphide, and mixtures thereof. The samples were heated in air from ambient temperature to 1000° C. at a heating rate of 10° C./minute.

It can be clearly seen that chemical reactions are occurring in the mixtures of tin and iron disulphide at elevated temperatures, possibly resulting in the formation of tin sulphide species. It would also appear that mixtures containing tin (IV) only result in products containing tin (IV) products, as expected.

In order to demonstrate the formation of a lubricating phase when a tin source and a sulphur source are incorporated into a friction material, the tin source and the sulphur source were encapsulated in an organic polymer (PIB) for further testing. These blends of materials are not friction materials in themselves; however tests on these blends under the conditions in which a friction material might operate serve to demonstrate the viability of this approach to a lubricating phase for a friction material. Table 2 shows various blends of the tin and sulphur sources with the organic polymer. The PIB polymer is incorporated in a typical quantity of ≦5% by weight.

Table 3 shows X-ray powder diffraction data for blends 1, 2, 3 and 4 (whose composition is described in Table 2) after being heated at 500° C. for 2 hours. The data shows that blends 1 and 2 (comprising mixtures of tin metal powder with iron disulphide) both show evidence of thermal reaction to form tin-sulphur species. Whereas blends 3 and 4 (comprising mixtures of tin (IV) oxide with iron disulphide) do not show any evidence of reaction products. One possible explanation for this would be that the Sn (IV) species need to be reduced to Sn (II) before formation of the lubricating phase, which is not possible at the reaction temperature.

Table 4 details the general composition of the trial brake pad formulations.

Table 5 details various lubricating phases/precursors added to the general composition described in Table 4 (all in 5% by volume). In addition, Table 5 details the results of wear tests on the various brake pad formulations. The results clearly show the effectiveness of blends 1 to 4 in reducing the wear rate of the brake pad formulations compared to the composition C1 in which no lubricating phase is added; in addition, the results show that the performance of blends 1 to 4 is comparable or better than the performance of the conventional lubricating phases $Sb_2S_3$ or PbS (in comparative examples C2 and C3) or the commercial lubricating phases (in comparative examples C4 and C5).

Table 5 also details the friction of coefficient measured for the various brake pad formulations. These show little variation between the different samples.

Table 6 shows a X-Ray Diffraction (XRD) study on the powdered surfaces of the prototype brake pads formulated using blends 2 and 4 (whose compositions are given in Table 2), carried out at 500° C. In both cases reaction to form tin sulphide (SnS) as the major product is evident. Overall, the phase analyses for the two powdered surfaces were almost identical, although the pad containing blend 4 did show some unreacted $SnO_2$. This result for blend 4 is in contrast to the results in Table 3 where no tin sulphide was formed in compositions containing $SnO_2$. This therefore emphasises the importance of heat produced by friction in the production of the lubricating phase, as no reaction was evident in the absence of friction.

Table 7 illustrates various ways in which the sol-gel technique can be used to prepare novel products comprising an intimate blend of inorganic tin species with iron disulphide.

Table 8 details a series of calculation to establish weight ratios of the components required to produce 5% $SnS_2$ in brake pad formulations.

EXAMPLES

TABLE 1

Thermoanalytical data for tin and iron disulphide, and mixtures thereof

| Sample | Residue at 1000° C. (%) | Stage | Weight loss (%) | Onset (° C.) | Peak (° C.) | End (° C.) | Peak area (μVs/mg) |
|---|---|---|---|---|---|---|---|
| FeS2 | 67.8 | 1 | 20.4 | 414 | 451 | 526 | +1706 |
|  |  | 2 | 6.5 | 526 | — | 679 | — |
|  |  | 3 | 5.3 | 679 | 776 | 1000 | +391 |
| Sn | 118.9 | 1 | — | 231 | 248 | 268 | −35 |
|  |  | 2 | (+14.0) | 544 | 585 | 606 | +213 |
|  |  | 3 | (+4.9) | 708 | 887 | 917 | +40 |
| SnO2 | 101.6 | 1 | (+1.6) | 300 | — | 1000 | — |
| Sn + FeS2 (1:1) | 98.9 | 1 | — | 231 | 241 | 256 | −16 |
|  |  | 2 | 5.2 | 390 | 401 | 426 | +21 |
|  |  | 3 | 1.1 | 573 | 589 | 605 | −12 |
|  |  | 4 | (+2.9) | 695 | 700 | 717 | +99 |
|  |  | 5 | (+2.3) | 746 | 762 | 765 | — |
| Sn + FeS2 (1:2) | 90.5 | 1 | — | 228 | 236 | 251 | −8 |
|  |  | 2 | 6.8 | 398 | 480 | 530 | +296 |
|  |  | 3 | 3.8 | 568 | 658 | 680 | +141 |
|  |  | 4 | (+1.1) | 700 | 704, 720 | 721 | +67 |

TABLE 1-continued

Thermoanalytical data for tin and iron disulphide, and mixtures thereof

| Sample | Residue at 1000° C. (%) | Stage | Weight loss (%) | Onset (° C.) | Peak (° C.) | End (° C.) | Peak area (µVs/mg) |
|---|---|---|---|---|---|---|---|
| Sn + FeS2 (1:5) | 80.5 | 1 | — | 232 | 238 | 250 | −4 |
| | | 2 | 17.8 | 408 | 485 | 534 | +1242 |
| | | 3 | 1.7 | 534 | 575 | 617 | |
| | | 4 | — | 704 | 748 | 774 | +53 |
| SnO2 + FeS2 (1:1) | 87.2 | 1 | 8.7 | 434 | 460 | 487 | +670 |
| | | 2 | 3.3 | 541 | — | 688 | |
| | | 3 | 0.8 | 688 | — | 815 | |
| SnO2 + FeS2 (1:2) | 81.9 | 1 | 14.1 | 420 | 488 | 516 | +920 |
| | | 2 | 2.8 | 524 | — | 680 | |
| | | 3 | 1.2 | 680 | — | 867 | |
| SnO2 + FeS2 (1:5) | 76.2 | 1 | 13.7 | 379 | 478 | 509 | +1123 |
| | | 2 | 6.8 | 509 | 579 | 593 | |
| | | 3 | 2.1 | 593 | — | 701 | |
| | | 4 | 1.2 | 701 | — | 864 | |

TABLE 2

Compositions and analysis of powder blends

| Blend number | Stoichiometry of components* | Sn analysis (%) Calc. | Sn analysis (%) Found | Fe analysis (%) Calc. | Fe analysis (%) Found | Density (g/cm³) |
|---|---|---|---|---|---|---|
| 1 | Sn + FeS2 | 44.7 | 48.1 | 21.1 | 18.9 | 5.99 |
| 2 | Sn + 2 FeS2 | 29.8 | 31.0 | 28.0 | 25.1 | 5.56 |
| 3 | SnO2 + FeS2 | 39.4 | 41.7 | 18.5 | 16.8 | 5.95 |
| 4 | SnO2 + 2 FeS2 | 27.3 | 30.8 | 25.7 | 23.4 | 5.57 |
| 5 | Colloidal tin phosphate** + FeS2 (1:1) | — | 37.1 | — | 16.3 | Not measured |

*In addition, each blend contains ≦5 weight percent PIB.
**Colloidal tin phosphate reacted on to solid FeS2. The tin/sulphur product was synthesised using the sol-gel technique, using the pH adjustment method.

TABLE 3

X-ray powder diffraction data for precursor blends after heat treatment

| Sample* (see table 2 for compositions of blends) | Phase identified | Semi-quantitative intensity ratio | Content of sulphides of tin |
|---|---|---|---|
| Blend 1 Sn + FeS2 | SnS | 64% | 64% |
| | FeS | 26% | |
| | SnO2 | 10% | |
| Blend 2 Sn + 2 FeS2 | FeS2 | 35% | 29% |
| | Fe7S8 | 25% | |
| | Sn2S3 | 14% | |
| | SnS | 11% | |
| | SnO2 | 6% | |
| | Fe2O3 | 4% | |
| | Fe2SnS4 | 4% | |
| Blend 3 SnO2 + FeS2 | SnO2 | 68% | — |
| | FeS2 | 32% | |
| Blend 4 SnO2 + 2 FeS2 | SnO2 | 51% | — |
| | FeS2 | 49% | |

*All sample blends were heated in air at 500° C. for 2 hours.

TABLE 4

General composition of trial brake pad formulations

| Component | Density (g/cm³) | Volume (%) |
|---|---|---|
| Twaron 1099D | 1.43 | 3.0 |
| Graphite 8787 | 2.15 | 9.5 |
| Graphite 8849 | 2.18 | 6.5 |
| J1506H resin | 1.30 | 18.0 |
| Brass DT4 | 8.50 | 2.0 |
| Exfoliated vermiculite | 2.60 | 3.5 |
| Rockwool RB270 | 2.78 | 10.5 |
| Coke D22T | 2.08 | 10.0 |
| Copper fibre | 8.90 | 2.0 |
| Sunny steel fibre 191 | 7.71 | 4.5 |
| Zeon Nipol TPC3 | 1.06 | 8.0 |
| Barytes | 4.25 | 10.5 |
| Micro Bauxilite 500/800 | 3.90 | 1.0 |
| 6000-7 Friction dust | 1.30 | 6.0 |
| Lubricating phase/precursors | * | 5.0 |
| TOTAL | — | 100.0 |

* density of lubricating phase varies according to its composition

TABLE 5

Dynamometer and AKM performance test data for trial brake pad compositions

| Brake pad formulation | C1 | C2 | C3 | C4 | C5 | 1 | 2 | 3 | 4 | 5 |
|---|---|---|---|---|---|---|---|---|---|---|
| Lubricating phase/precursor additive* | None | Sb2S3 | PbS | 'Ultimate C'** | 'CPG2'*** | Blend 1* | Blend 2* | Blend 3* | Blend 4* | Blend 5* |
| Density (g/cm³) | 2.56 | 2.58 | 2.70 | 2.56 | 2.54 | 2.64 | 2.63 | 2.66 | 2.62 | 2.60 |
| Wear test rate (cm³/MJ) | | | | | | | | | | |
| at 150° C. | 0.0734 | 0.0630 | 0.0598 | 0.0694 | 0.0773 | 0.0647 | 0.0600 | 0.0659 | 0.0643 | 0.0432 |
| at 300° C. | 0.2030 | 0.1242 | 0.1022 | 0.1809 | 0.1666 | 0.0948 | 0.1271 | 0.1020 | 0.1267 | 0.1232 |
| at 400° C. | 0.2492 | 0.1251 | 0.1178 | 0.1754 | 0.1215 | 0.0824 | 0.0720 | 0.0782 | 0.0919 | 0.1052 |
| at 500° C. | 0.3698 | 0.3087 | 0.3412 | 0.3325 | 0.2983 | 0.2746 | 0.3312 | 0.2690 | 0.2945 | 0.2716 |
| AKM tests | | | | | | | | | | |
| mu nominal | 0.43 | 0.45 | 0.43 | 0.43 | 0.43 | 0.46 | 0.42 | 0.44 | 0.45 | Not tested |
| mu minimum | 0.17 | 0.20 | 0.13 | 0.19 | 0.21 | 0.19 | 0.19 | 0.18 | 0.20 | Not tested |

*All friction stabilisers incorporated at 5% by volume level in formulation- see table 4 for their complete compositions.
**'Ultimate C' is a proprietary antimony trisulphide replacement marketed by Itaprochim and known to contain MoS2 and FeS2.
***'CPG2' is a proprietary friction stabilising additive marketed by Chemetall and claimed to contain 90% SnS2.

TABLE 6

X-ray powder diffraction data for surfaces of trial brake pad formulations after dynamometer wear tests

| Sample* | Phase identified | Chemical formula | Relative amount |
|---|---|---|---|
| Brake pad formulation 2** | Herzenbergite | SnS | High |
| | Cassiterite | $SnO_2$ | Medium |
| | Magnetite | $Fe_3O_4$ | Medium |
| | Marcasite | $FeS_2$ | Low |
| | Pyrite | $FeS_2$ | Low |
| | Tin(II) oxide | SnO | Low |
| Brake pad formulation 4** | Herzenbergite | SnS | High |
| | Cassiterite | $SnO_2$ | High |
| | Magnetite | $Fe_3O_4$ | Medium |
| | Marcasite | $FeS_2$ | Low |
| | Pyrite | $FeS_2$ | Low |
| | Tin(II) oxide | SnO | Low |

*Both brake pads had been subjected to dynamometer wear tests at 500° C.
**Details of brake pad formulations are given in Tables 4 and 5.

TABLE 7

Analytical data for colloidal tin - coated iron disulphide powders

| Sample | Method | Sn (%) | Fe (%) | P (%) | S (%) |
|---|---|---|---|---|---|
| $FeS_2$ (uncoated) | — | — | 38.5 | — | 47.0 |
| $FeS_2$ + colloidal tin oxide | Addition | 19.6 | 29.4 | — | 34.2 |
| $FeS_2$ + colloidal tin oxide (2:1) | pH adjustment | 12.0 | 22.7 | — | 25.2 |
| $FeS_2$ + colloidal tin oxide (1:1) | pH adjustment | 45.6 | 15.0 | — | 16.9 |
| $FeS_2$ + colloidal tin tartrate | Addition | 8.1 | 36.1 | — | 42.2 |
| $FeS_2$ + colloidal tin tartrate (2:1) | pH adjustment | 22.3 | 28.3 | — | 31.8 |
| $FeS_2$ + colloidal tin tartrate (1:1) | pH adjustment | 29.3 | 23.0 | — | 25.3 |
| $FeS_2$ + colloidal tin phosphate | Addition | 18.2 | 25.7 | 3.0 | 29.7 |
| $FeS_2$ + colloidal tin phosphate (2:1) | pH adjustment | 22.4 | 24.0 | 4.1 | 27.4 |
| $FeS_2$ + colloidal tin phosphate (1:1) | pH adjustment | 32.3 | 17.5 | 5.0 | 19.1 |
| $FeS_2$ + colloidal tin phosphate (1:1) - 1 kg sample | pH adjustment | 37.1 | 16.3 | 4.5 | 15.6 |

TABLE 8

Calculated weight ratios of sulphur sources to tin sources required to produce 5% $SnS_2$ in brake pad formulations (a) Sulphur
$Sn + 2S \rightarrow SnS_2$

| | S | Sn | SnO | $SnO_2$ | $SnS_2$ |
|---|---|---|---|---|---|
| Atomic/molecular weight | 32.07 | 118.71 | 134.71 | 150.71 | 182.85 |
| % required (stoichiometric) | 1.75 | 3.25 | 3.68 | 4.12 | 5.00 |
| % required (2 × stoichiometric) | 3.50 | 3.25 | 3.68 | 4.12 | 5.00 |
| % required (5 × stoichiometric) | 8.75 | 3.25 | 3.68 | 4.12 | 5.00 |

(b) Iron sulphide
$Sn + 2FeS \rightarrow SnS_2 + 2Fe$

| | FeS | Sn | SnO | $SnO_2$ | $SnS_2$ |
|---|---|---|---|---|---|
| Atomic/molecular weight | 87.92 | 118.71 | 134.71 | 150.71 | 182.85 |
| % required (stoichiometric) | 4.81 | 3.25 | 3.68 | 4.12 | 5.00 |
| % required (2 × stoichiometric) | 9.62 | 3.25 | 3.68 | 4.12 | 5.00 |
| % required (5 × stoichiometric) | 24.05 | 3.25 | 3.68 | 4.12 | 5.00 |

(c) Iron disulphide
$Sn + FeS_2 \rightarrow SnS_2 + Fe$

| | $FeS_2$ | Sn | SnO | $SnO_2$ | $SnS_2$ |
|---|---|---|---|---|---|
| Atomic/molecular weight | 119.99 | 118.71 | 134.71 | 150.71 | 182.85 |
| % required (stoichiometric) | 3.28 | 3.25 | 3.68 | 4.12 | 5.00 |
| % required (2 × stoichiometric) | 6.56 | 3.25 | 3.68 | 4.12 | 5.00 |
| % required (5 × stoichiometric) | 16.40 | 3.25 | 3.68 | 4.12 | 5.00 |

(d) Copper sulphide
$Sn + 2Cu_2S \rightarrow SnS_2 + 4Cu$

| | $Cu_2S$ | Sn | SnO | $SnO_2$ | $SnS_2$ |
|---|---|---|---|---|---|
| Atomic/molecular weight | 159.17 | 118.71 | 134.71 | 150.71 | 182.85 |
| % required (stoichiometric) | 8.70 | 3.25 | 3.68 | 4.12 | 5.00 |
| % required (2 × stoichiometric) | 17.40 | 3.25 | 3.68 | 4.12 | 5.00 |
| % required (5 × stoichiometric) | 43.50 | 3.25 | 3.68 | 4.12 | 5.00 |

The invention claimed is:

1. A process for the in-situ formation of a lubricating phase comprising sulphur and tin in a friction material, wherein reaction of a sulphur source with a tin source in said friction material results in the formation of said lubricating phase, and wherein said reaction is initiated or effected by heat resulting, in use, from the generation of friction, wherein said sulphur source is selected from one or both of sulphur and/or a metal sulphide selected from one or more of iron, copper, zinc, titanium and bismuth, and wherein said tin source is selected from one or more of tin, a tin-containing compound and/or a tin-containing alloy.

2. The process as claimed in claim 1, wherein said lubricating phase is or includes a sulphide of tin.

3. The process as claimed in claim 2, wherein said sulphide of tin has the general formula $Sn_xS_y$, wherein x is from 0.5 to 5 and y is from 1 to 10.

4. The process as claimed in claim 2, wherein said sulphide of tin is selected from one or more of SnS, $SnS_2$ and $Sn_2S_5$.

5. The process as claimed in claim 2, wherein said metal sulphide is selected from one or more of FeS, $FeS_2$, $Cu_2S$, ZnS, $TiS_2$ and $Bi_2S_3$.

6. The process as claimed in claim 2, wherein said tin source is selected from one or more of SnO, $SnO_2$ and a Cu—Sn bronze.

7. The process as claimed in claim 2, wherein there is an excess of the sulphur source above the stoichiometric level required to form a lubricating phase comprising a sulphide of tin.

8. The process as claimed in claim 2, wherein said sulphur source and said tin source are present in said friction material in a combined total amount of up to 15% by weight.

9. The process as claimed in claim 8, wherein said sulphur source and said tin source are present in a combined total amount of from 0.5 to 10% by weight.

10. The process as claimed in claim 2, wherein said friction material further comprises a carbon source.

11. The process as claimed in claim 10, wherein the carbon source is selected from one or both of graphite and/or a polymer.

12. The process as claimed in claim 11, wherein said polymer is selected from one or more of nylon, PBT and a phenolic resin.

13. The process as claimed in claim 2, wherein said sulphur source and/or said tin source is/are encapsulated in a carbon source.

14. The process as claimed in claim 2, wherein said friction material further comprises one or both of a reducing agent and/or a catalyst.

15. The process as claimed in claim 2, wherein said sulphur source is coated with said tin source using a sol-gel technique.

16. The process as claimed in claim 2, wherein the lubricating phase acts as a friction stabiliser or modifier.

17. The process as claimed in claim 2, wherein said sulphur source and/or said tin source is/are provided in the form of fine powders for blending.

18. The process as claimed in claim 2, wherein the friction material is or is comprised in a brake pad, a brake shoe, a brake lining or a clutch lining.

19. A process for manufacturing a friction material for a friction element, the process comprising:

incorporating a sulphur source and a tin source into the friction element;

wherein the sulphur source is selected from the group consisting of sulphur, iron sulphide, copper sulphide, zinc sulphide, titanium sulphide, and combinations thereof;

wherein the tin source is selected from the group consisting of tin, a tin-containing compound, a tin-containing alloy, and combinations thereof;

wherein the sulphur source and the tin source are adapted to react with each other to form a lubricating phase upon exposure to heat resulting from the generation of friction.

20. The process of claim 19 comprising a further step of exposing the friction element to heat resulting from the generation of friction to thereby form said lubricating phase.

21. The process of claim 20 wherein the exposing the friction element to hear resulting from the generation of friction to thereby form said lubricating phase is performed during use of the friction element in its intended service application.

22. A process as claimed in claim 8, wherein said sulphur source and said tin source are present in a combined total amount of from 2 to 8% by weight.

23. A process as claimed in claim 8, wherein said sulphur source and said tin source are present in a combined total amount of from 4 to 6% by weight.

24. A process as claimed in claim 2, wherein said sulphur source and/or said tin source is/are provided in the form of fine powders for blending having a mean particle size of less than 50 μm.

* * * * *

UNITED STATES PATENT AND TRADEMARK OFFICE
CERTIFICATE OF CORRECTION

PATENT NO. : 8,197,585 B2  
APPLICATION NO. : 11/995173  
DATED : June 12, 2012  
INVENTOR(S) : Jeremy Arthur Pearce and Stephen John Glynn Page 1 of 1

It is certified that error appears in the above-identified patent and that said Letters Patent is hereby corrected as shown below:

On the title page, item 22, PCT Filed:

"Jul. 7, 2006"

Should read

-- Jul. 11, 2006 --.

Signed and Sealed this  
Twenty-third Day of October, 2012

David J. Kappos  
*Director of the United States Patent and Trademark Office*